April 25, 1933.   F. L. SCOTT   1,905,066
ROLLING DRILL CUTTER
Filed Aug. 19, 1930
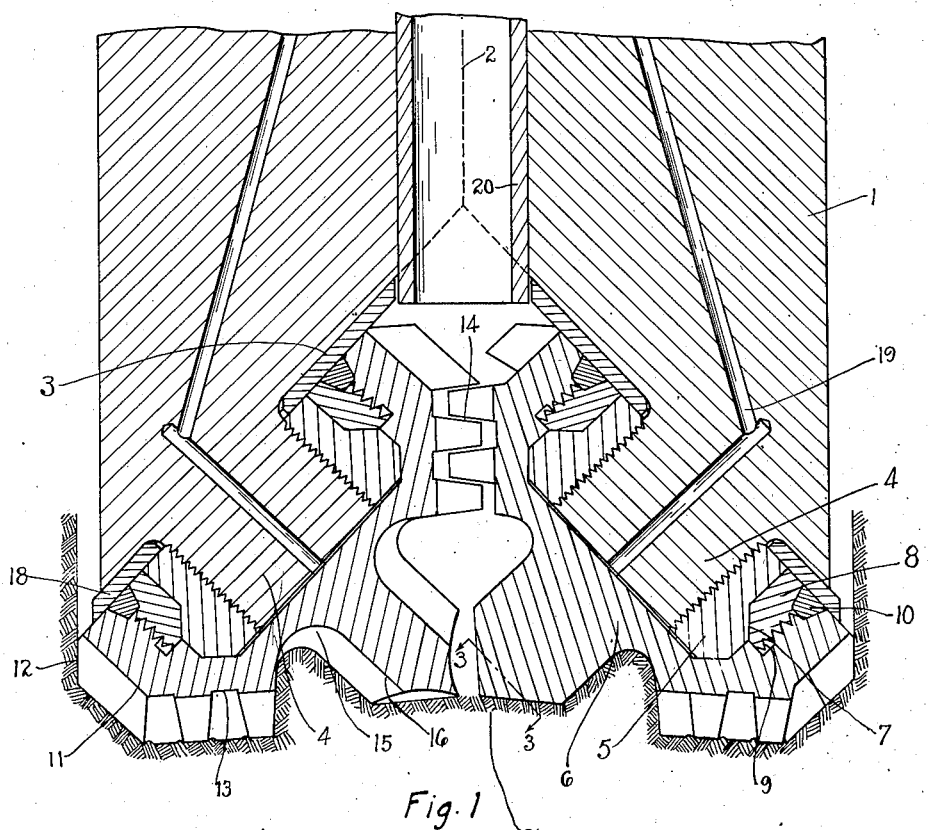
Fig. 1
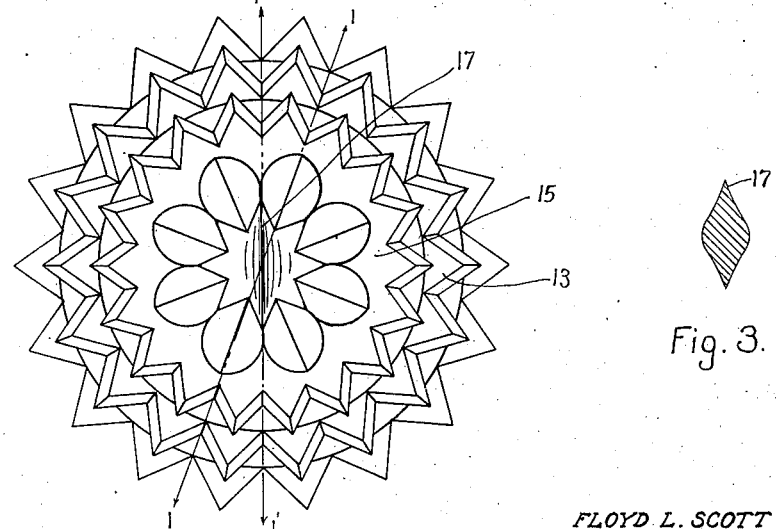
Fig. 2
Fig. 3.
FLOYD L. SCOTT INVENTOR
BY Jesse R. Stone
ATTORNEY Patented Apr. 25, 1933

1,905,066

UNITED STATES PATENT OFFICE

FLOYD L. SCOTT, OF HOUSTON, TEXAS, ASSIGNOR TO HUGHES TOOL COMPANY, OF HOUSTON, TEXAS, A CORPORATION OF TEXAS

ROLLING DRILL CUTTER

Application filed August 19, 1930. Serial No. 476,301.

This invention relates to roller earth boring drills for use in drilling deep wells, and, more particularly, to the construction and mounting of the cutters on such drills.

In the use of deep well drills in which the conical type of cutter is employed, it is found that the most effective traction of the cutters upon the well bottom is obtained where the cutters are so formed and mounted that they have a true rolling action upon the well bottom. This is accomplished in a conical cutter where the periphery of the cutter extended will come to an apex in the axis of rotation of the drill. Where true rolling motion is obtained, however, the teeth on the cutter have a direct chisel stroke which does not disintegrate the material as rapidly as when a scraping or turning of the teeth relative to the formation is obtained. Also it is found that cutters of smaller diameter cut faster because fewer teeth thereon are presented at each instant to the bottom of the hole to sustain the weight thereon.

It is an object of the invention to provide a cutter of the cone type in which the outer cutting area is formed into zones, some of which do not have a true rolling motion on the well bottom but which obtain a scraping or screw-driver action to more effectively disintegrate the material.

It is a further object to make the larger periphery or base of the cutter of as small diameter as possible consistent with safety.

I also aim to make the teeth with as small an included angle as possible consistent with strength, so as to obtain better penetration.

The invention resides generally in the provision of a cutter which is formed and mounted to engage and act upon the material at the well bottom so as to disintegrate and break up the material most effectively.

In the drawing herewith Fig. 1 is a central vertical section through the lower part of a drill equipped with my cutters, one cutter being in section on the line 1—1, and the other in section on the line 1'—1' of Fig. 2.

Fig. 2 is an end view of one of the cutters.

Fig. 3 is a transverse section on the line 3—3 of Fig. 1.

The cutters shown in the drawing are mounted upon a drill head 1 of ordinary construction. It is split longitudinally along the line 2, and its lower end has a notch or recess shaped like an inverted V in side view, and upon the flat sides 3 of the recess are formed integral cutter shafts 4 extending at right angles to the surface of the faces 3 and at approximately right angles to each other.

Upon the shafts 4 are screwed the cutter bushings 5 for the cutters 6. Said bushings have their outer ends enlarged externally to form an inner beveled shoulder 7 against which the retaining ring 8 may bear to prevent removal of the cutter.

The cutter 6 is of a general conical shape but its periphery is formed to carry out my invention. Its interior is formed with a recess at the base to receive the bushing 5. It is threaded at 9 to engage the retaining ring which is held against unscrewing by a bond of welded material 10.

The periphery of each cutter has a cylindrical zone 11 at its base, the outer edge of which is beveled slightly at 12 to form the side wall of the hole. Toward the apex from the cylindrical zone, the cutter has a conical area 13 which secures firm traction upon the well bottom. Both the zones 11 and 13 are toothed, the teeth on the mating cones being offset relative to each other as shown at 14 along the central axis of the drill.

To provide a cylindrical zone on each cutter near the center of the hole, I cut an annular recess 15 therein adjacent the conical area, thus forming a zone 16 which is toothed to engage the bottom most effectively. The zone 16 of each cutter will not have the true rolling action of a cone but will have a scraping and twisting action somewhat like a screwdriver. At the apex of each cutter, the crest is formed by a diametrical sharpened edge 17 so as to chip and break away the central area of the well bottom.

Between each cutter and the face of the drill head is a washer 18 to take the wear due to the inward thrust of the cutter in use.

The lubrication is obtained through oil ducts 19 leading from some container for lubricant through the head of the drill to the ends of the cutter shafts within the interior of each cutter. The flushing fluid finds a passage through a flow pipe 20 axially of the head to the cutters.

The features of advantage in my cutter are the smaller exterior diameter of the cylindrical peripheral zones along the areas 11 and 15, as compared with the common form of conical cutter which allow the teeth to penetrate the formation better, due to greater weight per tooth in contact with the bottom. Also the teeth may be of less included angle and thus sharper. The teeth along the zone 13 will cause effective traction to rotate the cutter. The cylindrical area 16 on each cutter adjacent the center of the hole is somewhat to the rear of the area 13 in operation and will break up the interior zone of the well bottom more effectively and will obtain a screwdriver action toward the apex which is of advantage in breaking up the material of the short core 21 left within the zone cut by the area 13.

It is to be noted that I obtain the most effective cutting action along the areas 11 and 16. That is near the outer wall of the hole and adjacent the center. This will assure a rapid cutting action not otherwise obtainable.

What I claim as new is:

1. A well drill including a head, a pair of downwardly and inwardly inclined shafts thereon, inwardly tapered, cutters rotatable on said shafts, said cutters having a toothed cylindrical area, positioned to cut the outer part of the hole, and a toothed cylindrical area adjacent the center of the hole.

2. A well drill including a head, a pair of downwardly and inwardly inclined shafts thereon, inwardly tapered, cutters rotatable on said shafts, said cutters having a toothed cylindrical area, positioned to cut the outer part of the hole, and a toothed cylindrical area adjacent the center of the hole, and an intermediate area which is approximately a frustum of a cone.

3. A well drill including a head, a pair of downwardly and inwardly inclined shafts thereon, cutters rotatable on said shafts, said cutters having an outer toothed cylindrical area, positioned to cut the clearance at the side wall of the well hole, an inner toothed cylindrical area, and an intermediate area presented vertically downwardly upon the bottom of the hole to obtain traction for rotating said cutters.

4. A well drill including a head, a pair of opposed cutters mounted rotatably thereon, each cutter having an outer cylindrical toothed area, and an adjacent tapered area, teeth on said tapered area which are spaced apart and offset relative to the teeth on the adjacent cutter, and a toothed peripheral groove in each of said cutters providing a cylindrical surface adjacent the apex of the cutter.

5. A well drill including a head, a pair of opposed cutters mounted rotatably thereon, each cutter having an outer cylindrical toothed area, and an adjacent tapered area, teeth on said tapered area which are spaced apart and offset relative to the teeth on the adjacent cutter, a toothed cylindrical area adjacent the apex of each cutter, and a sharp edge at said apex.

6. In a cutter for earth boring drills of approximately conical shape, a toothed outer periphery thereon which is cylindrical adjacent the base, a toothed cylindrical area adjacent the apex, an intermediate area of tapered contour, and teeth on said tapered area adapted to be presented downwardly upon the bottom of the hole.

7. In a cutter for earth boring drills of approximately conical shape, a toothed outer periphery thereon which is cylindrical adjacent the base, a toothed cylindrical area adjacent the apex, an intermediate area of tapered contour, a diametrical cutting edge at said apex, and teeth on said tapered area adapted to be presented downwardly upon the bottom of the hole.

8. A cutter for earth boring drills of approximately conical shape, a toothed outer periphery thereon which is cylindrical adjacent the base, an annular recess, one side wall of which provides a cylindrical area adjacent the apex, an intermediate area of tapered contour, and teeth on said tapered area adapted to be presented downwardly upon the bottom of the hole.

9. A cutter for roller earth boring drills, said cutter being of approximately conical shape, the periphery of said cutter being toothed and having an annular recess to form adjacent the apex of said cutter a cylindrical toothed cutting zone.

In testimony whereof, I hereunto affix my signature, this the 14th day of August, A. D. 1930.

FLOYD L. SCOTT.